US011687470B2

(12) United States Patent
Kuzmack et al.

(10) Patent No.: US 11,687,470 B2
(45) Date of Patent: *Jun. 27, 2023

(54) EXPANDER I/O MODULE DISCOVERY AND MANAGEMENT SYSTEM

(71) Applicant: Dell Products L.P., Round Rock, TX (US)

(72) Inventors: Eric Kuzmack, Georgetown, TX (US); Pawan Kumar Singal, Milpitas, CA (US); Balaji Rajagopalan, Sunnyvale, CA (US); Ning Zhuang, San Jose, CA (US); Joseph LaSalle White, San Jose, CA (US); Sudhir Vittal Shetty, Cedar Park, TX (US); Babu Krishna Chandrasekhar, Round Rock, TX (US); Zoheb Khan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,270

(22) Filed: Jul. 8, 2022

(65) Prior Publication Data

US 2022/0342832 A1 Oct. 27, 2022

Related U.S. Application Data

(63) Continuation of application No. 16/526,624, filed on Jul. 30, 2019, now Pat. No. 11,416,424.

(51) Int. Cl.
*G06F 13/10* (2006.01)
*G06F 13/12* (2006.01)

(52) U.S. Cl.
CPC .......... *G06F 13/107* (2013.01); *G06F 13/122* (2013.01); *G06F 13/126* (2013.01)

(58) Field of Classification Search
CPC ..... G06F 13/107; G06F 13/122; G06F 13/126
See application file for complete search history.

(56) References Cited

U.S. PATENT DOCUMENTS 8,625,596 B1 * 1/2014 Thomas .............. H04L 41/0672
370/392
9,258,192 B2 * 2/2016 Thomas .............. H04L 41/0876
(Continued)

*Primary Examiner* — Henry Tsai
*Assistant Examiner* — John B Roche
(74) *Attorney, Agent, or Firm* — Joseph Mencher

(57) ABSTRACT

An expander I/O module discovery/management system includes a secondary system chassis housing an expander I/O module coupled to a server device. The server device identifies the secondary system chassis and an expander I/O module port utilized by that server device, and then generates and transmits an expander I/O module reporting communication identifying the secondary system chassis and the expander I/O module port. A primary system chassis houses a switching I/O module coupled to the expander I/O module. The switching I/O module receives the expander I/O module reporting communication and determines that the secondary system chassis identified in the expander I/O module reporting communication is different than the primary system chassis. In response, the switching I/O module assigns a virtual slot to the expander I/O module, and assigns a virtual port associated with the virtual slot to the expander I/O module port identified in the expander I/O module reporting communication.

20 Claims, 13 Drawing Sheets

1300

| SERVICE TAG | MODEL | TYPE | SYSTEM CHASSIS SERVICE TAG | SYSTEM CHASSIS SLOT | PORT GROUP | VIRTUAL SLOT ID |
|---|---|---|---|---|---|---|
| 9ZZRPK2 | MX7116n Expander Module | 1 | 20CCT08 | A1 | port-group1/1/7 | 77 |
| FKHFXC2 | MX7116n Expander Module | 1 | 20CCT07 | A1 | port-group1/1/6 | 76 |
| JRHFXC2 | MX7116n Expander Module | 1 | 20CCT05 | A1 | port-group1/1/4 | 74 |
| 8LHFXC2 | MX7116n Expander Module | 1 | 20CCT04 | A1 | port-group1/1/3 | 73 |
| CKHFXC2 | MX7116n Expander Module | 1 | 20CCT06 | A1 | port-group1/1/5 | 75 |
| 9MHFXC2 | MX7116n Expander Module | 1 | 20CCT10 | A1 | port-group1/1/10 | 80 |
| 3RHFXC2 | MX7116n Expander Module | 1 | 20CCT03 | A1 | port-group1/1/2 | 72 |
| 5ZZRPK2 | MX7116n Expander Module | 1 | 20CCT09 | A1 | port-group1/1/8 | 78 |
| 2SHFXC2 | MX7116n Expander Module | 1 | 20CCT02 | A1 | port-group1/1/1 | 71 |

(56) References Cited

U.S. PATENT DOCUMENTS

| | | | |
|---|---|---|---|
| 11,416,424 B2* | 8/2022 | Kuzmack | G06F 13/122 |
| 2008/0225856 A1* | 9/2008 | Kawamura | H04L 12/40 |
| | | | 370/395.3 |
| 2015/0023182 A1* | 1/2015 | Nakagawa | H04W 24/08 |
| | | | 370/243 |
| 2019/0018698 A1* | 1/2019 | Wang | G06F 9/45558 |

* cited by examiner

| SUB-TYPE | PROPERTY | COMMENTS |
|---|---|---|
| 1 | ORIGINATOR | "BMC" STRING USED AS ORIGINATOR TO ALLOW BMC LLDP ID |
| 2 | PORT TYPE | 1: BMC PORT; 2: NIC PORT; 3: BMC AND NIC PORT (SHARED) |
| 3 | PORT FQDD | ALLOWS ID OF NIC PORT IN SERVER DEVICE |
| 4 | SERVER SERVICE TAG | ALLOWS ID OF SERVER DEVICE |
| 5 | SERVER MODEL NAME | ALLOWS ID OF SERVER DEVICE MODEL |
| 6 | SERVER SLOT NUMBER | ALLOWS ID OF SYSTEM CHASSIS SLOT HOUSING SERVER DEVICE |
| 7 | CHASSIS SERVICE TAG | ALLOWS ID OF SYSTEM CHASSIS |
| 8 | CHASSIS MODEL NAME | ALLOWS ID OF SYSTEM CHASSIS MODEL |
| 9 | IOM SERVICE TAG | ALLOWS ID OF IOM |
| 10 | IOM MODEL NAME | ALLOWS ID OF IOM MODEL |
| 11 | IOM SLOT LABEL | ALLOWS ID OF SYSTEM CHASSIS SLOT HOUSING IOM |
| 12 | IOM PORT NUMBER | ALLOWS ID OF IOM PORT PROVIDED FOR SERVER DEVICE |

FIG. 10

| SERVICE TAG | MODEL | TYPE | SYSTEM CHASSIS SERVICE TAG | SYSTEM CHASSIS SLOT | PORT GROUP | VIRTUAL SLOT ID |
|---|---|---|---|---|---|---|
| 9ZZRPK2 | MX7116n Expander Module | 1 | 20CCT08 | A1 | port-group1/1/7 | 77 |
| FKHFXC2 | MX7116n Expander Module | 1 | 20CCT07 | A1 | port-group1/1/6 | 76 |
| JRHFXC2 | MX7116n Expander Module | 1 | 20CCT05 | A1 | port-group1/1/4 | 74 |
| 8LHFXC2 | MX7116n Expander Module | 1 | 20CCT04 | A1 | port-group1/1/3 | 73 |
| CKHFXC2 | MX7116n Expander Module | 1 | 20CCT06 | A1 | port-group1/1/5 | 75 |
| 9MHFXC2 | MX7116n Expander Module | 1 | 20CCT10 | A1 | port-group1/1/10 | 80 |
| 3RHFXC2 | MX7116n Expander Module | 1 | 20CCT03 | A1 | port-group1/1/2 | 72 |
| 5ZZRPK2 | MX7116n Expander Module | 1 | 20CCT09 | A1 | port-group1/1/8 | 78 |
| 2SHFXC2 | MX7116n Expander Module | 1 | 20CCT02 | A1 | port-group1/1/1 | 71 |

FIG. 13

EXPANDER I/O MODULE DISCOVERY AND MANAGEMENT SYSTEM

CROSS-REFERENCE TO RELATED APPLICATION

The present disclosure is a continuation of U.S. application Ser. No. 16/526,624, attorney docket no. 114244.01, filed on Jul. 30, 2019, the disclosure of which is incorporated by reference herein in its entirety.

BACKGROUND

The present disclosure relates generally to information handling systems, and more particularly to discovering and managing expander I/O modules provided in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided by multi-chassis systems, and each of the chassis in such multi-chassis systems may include, for example, multiple server devices (e.g., blade server devices) connected to Input/Output (I/O) modules, with I/O modules connected between chassis in order to allow server devices to transmit communications between each other and/or over a network. In some of these multi-chassis systems, it may be desirable to configure a "primary system" provided by a first chassis with a relatively sophisticated switching I/O module that is configured to perform switching functions for transmitting communications over a network, while configuring one or more "secondary systems" provided by respective second chassis with relatively unsophisticated expander I/O modules that operate as passive pass-through devices and without the switching functionality available in the switching I/O module, with each of the expander I/O modules in the secondary systems connected to the switching I/O module in the primary system, and the switching I/O module performing the switching functions discussed above for each of the secondary systems. As will be appreciated by one of skill in the art, such multi-chassis configurations allow for the use of several relatively inexpensive expander I/O modules with a single relatively expensive switching I/O module, while reducing cabling needed for the multi-chassis system (e.g., a single cable may be provided between each the expander I/O module in each secondary system and the switching I/O module in the primary system.) However, such multi-chassis configurations involve port extension and expansion, as well as pass-through forwarding operations performed by the secondary systems, which can make port identification and numbering of the ports on the secondary systems difficult, as those ports must be discovered, identified, numbered, and managed in a manner that takes into account the connection of components in both the primary system and the secondary system to the switching I/O module in order to coordinate the port assignment and numbering, with the need to exchange information between the primary system and its components and the secondary system and its components.

Accordingly, it would be desirable to provide an expander I/O module discovery and management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an expander Input/Output (I/O) module discovery and management engine that is configured to: receive, via an expander I/O module that is housed in a secondary system chassis provided for a secondary system from a server device that is housed in the secondary system chassis provided for the secondary system and coupled to the expander I/O module, an expander I/O module reporting communication that identifies: the secondary system chassis; and an expander I/O module port on the expander I/O module that is utilized by the server device; determine, in response to receiving the expander I/O module reporting communication, that the secondary system chassis identified in the expander I/O module reporting communication is different than a primary system chassis that houses the processing system and, in response, assign a virtual slot to the expander I/O module; and assign a virtual port that is associated with the virtual slot to the expander I/O module port identified in the expander I/O module reporting communication.

BRIEF DESCRIPTION OF THE DRAWINGS

FIG. 10 is a table view illustrating an embodiment of an expander I/O reporting communication that may be generated by the secondary system of FIG. 5 during the method of FIG. 7.

FIG. 13 is a display view illustrating an embodiment of the results of a Command Line Interface (CLI) show command for expander I/O modules discovered during the method of FIG. 7.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
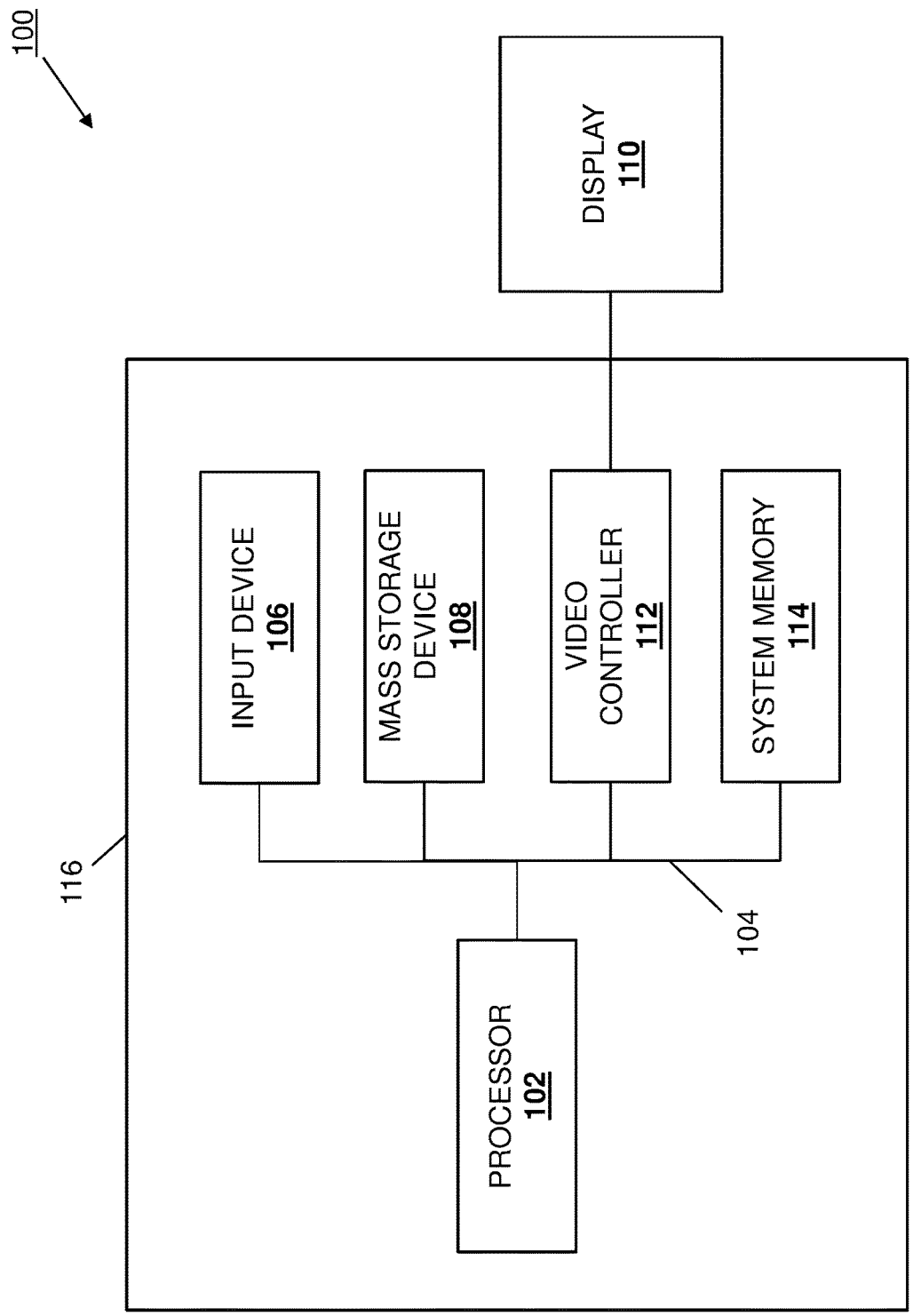
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
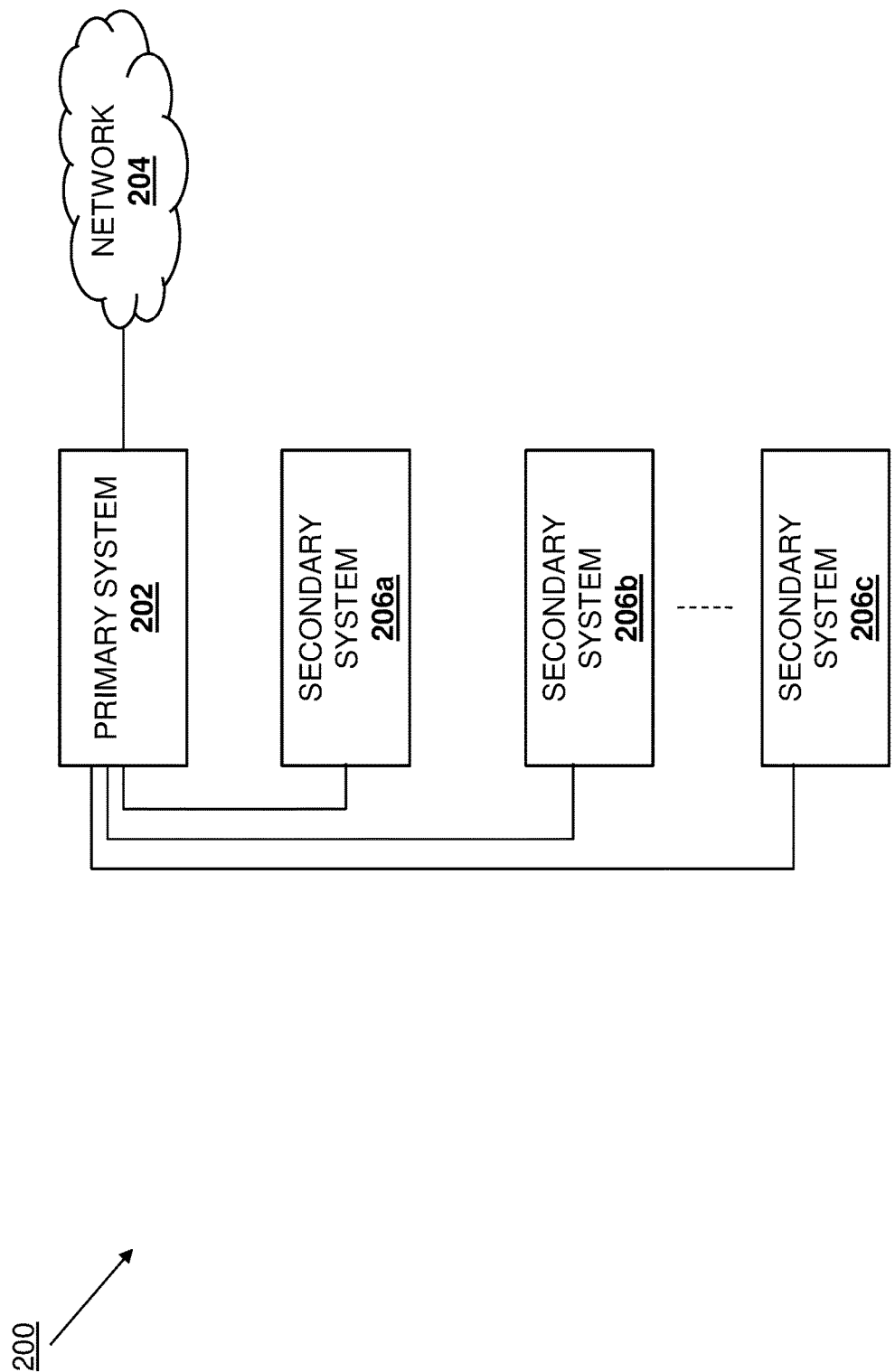
FIG. 2 is a schematic view illustrating an embodiment of a multi-chassis system.

Referring now to FIG. 2, an embodiment of a multi-chassis system 200 is illustrated. In the illustrated embodiment, the multi-chassis system 200 incudes a primary system 202 that is coupled to a network 204 that may be provided by a Local Area Network (LAN), the Internet, combinations thereof, and/or a variety of other networks known in the art. In an embodiment, the primary system 202 may be provided by the IHS 100 discussed above with reference to FIG. 1, and/or may include some or all of the components of the IHS 100. In the examples discussed below, the primary system 202 may be provided by a PowerEdge MX7000 Modular Chassis available from DELL® Inc. of Round Rock, Tex., United States, which in the examples discussed below includes a switching I/O module such as, for example, a PowerEdge MX5108n Ethernet Switch I/O Module switch device or a PowerEdge MX9116n switch device, each available from DELL® Inc. of Round Rock, Tex., United States, that is configured to perform relatively sophisticated switching operations for components in the primary system as well as the secondary system(s) discussed below in order to, for example, allow communications from those components to be transmitted over the network 204. However, while illustrated and discussed as a primary system with a switching I/O module, one of skill in the art in possession of the present disclosure will recognize that the primary system 202 provided in the multi-chassis system 200 may include any devices that may be configured to operate similarly as the primary system 200 discussed below by, for example, performing a variety other operations for itself and the secondary system(s).

In the illustrated embodiment, the primary system 202 is also coupled to a plurality of secondary systems 206a, 206b, and up to 206c. In an embodiment, any or all of the secondary systems 206a-c may be provided by the IHS 100 discussed above with reference to FIG. 1, and/or may include some or all of the components of the IHS 100. In the examples discussed below, the secondary systems 206a-c may be provided by the PowerEdge MX7000 Modular Chassis available from DELL® Inc. of Round Rock, Tex., United States, which includes an expander I/O module such as, for example, a PowerEdge MX7116n Fabric Expander I/O Module expander device, available from DELL® Inc. of Round Rock, Tex., United States, that is configured as passive pass-through device that connects components in its secondary system to the switching I/O module in the primary system in order to allow the switching I/O module in the primary system 202 to perform any needed switching operations in order to, for example, transmit its communications via the network 204. One of skill in the art in possession of the present disclosure will recognize that the primary system 202 and secondary systems 206a-c, each of which may be provided by the same type of chassis (e.g., the PowerEdge MX7000 Modular Chassis discussed above), may differ based on the types of cards provided for their I/O module, the presence of a management module, and/or other distinguishing features that would be apparent to one of skill in the art in possession of the present disclosure. However, while illustrated and discussed as secondary systems with a expander I/O modules, one of skill in the art in possession of the present disclosure will recognize that the secondary systems 206a-c provided in the multi-chassis system 200 may include any devices that may be configured to operate similarly as the secondary systems 206a-c discussed below by, for example, relying on a primary system to perform a variety of other operations.

As discussed above, a user of the multi-chassis system 202 may provide the primary system 202 with its relatively sophisticated switching I/O module that is configured to perform switching functions for transmitting communications over a network, while providing the secondary systems 206a-c with relatively unsophisticated expander I/O modules that operate as passive pass-through devices and without the switching functionality available in the switching I/O module. The user may then connect each of the expander I/O modules in the secondary systems to the switching I/O module in the primary system and, during operation of the multi-chassis system 200, the switching I/O module will perform switching functions for itself and each of the secondary systems. As will be appreciated by one of skill in the art in possession of the present disclosure, such multi-chassis configurations allow relatively inexpensive expander I/O modules to be utilized in the secondary system while being enabled to communicate via the network via a single cabling entity provided between those expander I/O modules and the relatively expensive switching I/O module that performs those switching operations, thus reducing the costs associated with the multi-chassis system 200 and the cabling required to provide it. However, while a specific multi-chassis system 200 has been illustrated and described, one of skill in the art in possession of the present disclosure will recognize that the system of the present disclosure may include a variety of systems and system configurations while remaining within the scope of the present disclosure as well.

Figure 3:
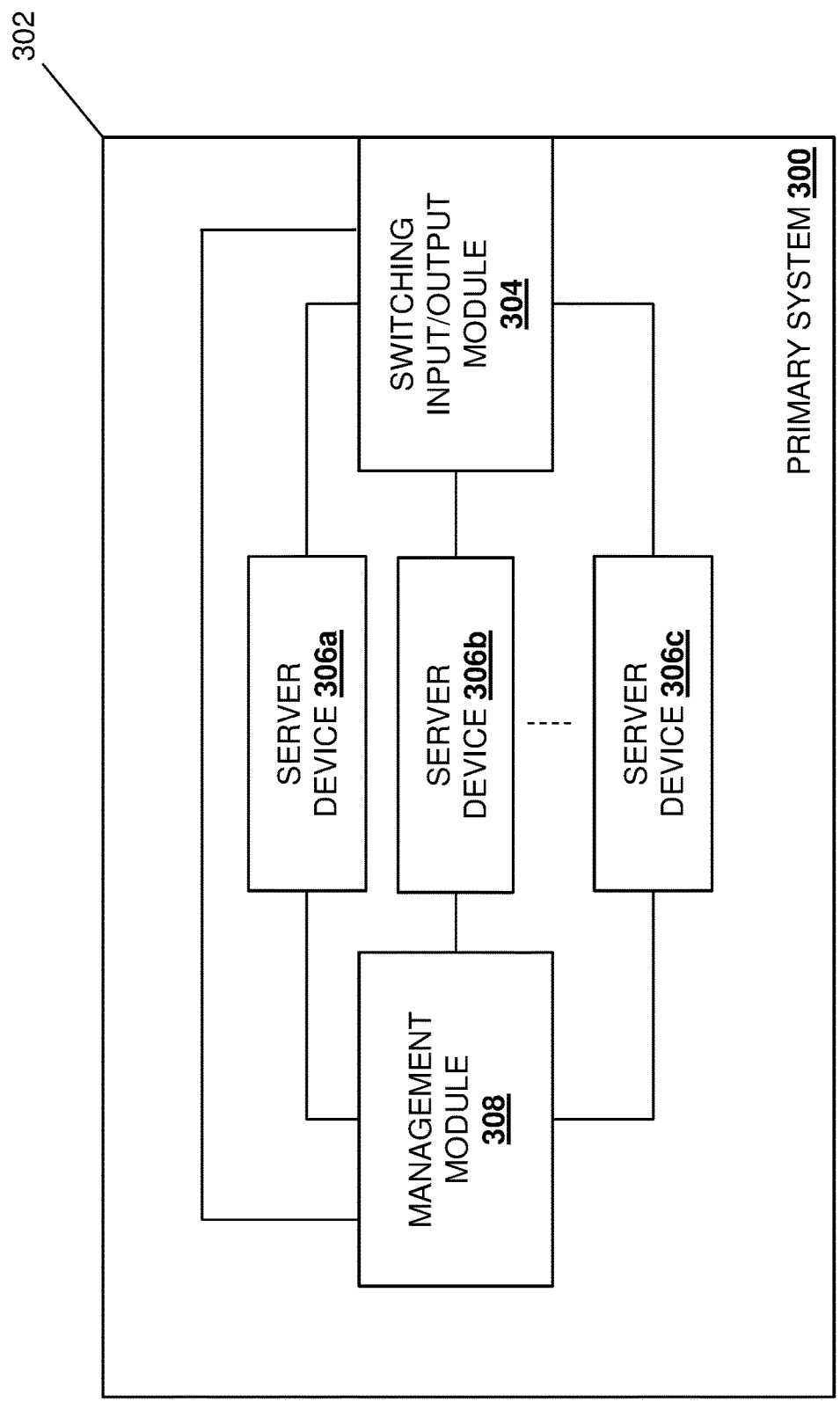
FIG. 3 is a schematic view illustrating an embodiment of a primary system that may be provided in the multi-chassis system of FIG. 2.

Referring now to FIG. 3, an embodiment of a primary system 300 is illustrated that may provide the primary system 202 discussed above with reference to FIG. 2. As such, the primary system 300 may be provided by the IHS 100 discussed above with reference to FIG. 1 and/or may include some or all of the components of the IHS 100, and in specific examples may include the PowerEdge MX7000 Modular Chassis available from DELL® Inc. of Round Rock, Tex., United States. Furthermore, while illustrated and discussed as a primary system with a switching I/O module, one of skill in the art in possession of the present disclosure will recognize that the primary system 300 may include any devices that may be configured to operate similarly as the primary system 300 discussed below by, for example, performing a variety other operations for itself and the secondary system(s). In the illustrated embodiment, the primary system 300 includes a primary system chassis 302 that houses the components of the primary system 300, only some of which are illustrated below.

For example, the primary system chassis 302 may house a switching I/O module 304 that, as discussed above, may be provided by the PowerEdge MX5108n Ethernet Switch I/O Module switch device or a PowerEdge MX9116n switch device, available from DELL® Inc. of Round Rock, Tex., United States, that is configured to perform relatively sophisticated switching operations for components in the primary system as well as the secondary system(s) discussed below in order to, for example, allow communications from those components to be transmitted over the network 204. While only a single switching I/O module 304 is illustrated, one of skill in the art in possession of the present disclosure will recognize that the primary system 202/300 will typically include multiple switching I/O modules (e.g., for redundancy), and such configurations are envisioned as falling within the scope of the present disclosure as well. I addition, while not illustrated, one of skill in the art in possession of the present disclosure will recognize that the switching I/O module 304 may include ports coupled to other devices such as, for example, "uplink" ports that couple to other switching I/O modules via an uplink Top Of Rack (TOR) switch device.

Furthermore, one of skill in the art in possession of the present disclosure will recognize that the switching I/O module 304 may include one or more fabric expander ports that couple to the expander I/O modules in the secondary systems 206a-c illustrated in FIG. 2. For example, the switching I/O module 304 may include fabric expander ports that provide a respective port group to connect to each expander I/O module in the secondary systems 206a-c, with each port group providing a 200G "front panel port" made up of eight 25G ports (called "physical breakout interfaces") that may be connected to its respective expander I/O module in a secondary system 206a-c via a single cabling entity that is configured to connect to the eight ports that provide the 200G front panel port to respective ports on the expander I/O module. In some examples, each port group provided by fabric expander ports may be provided in an "expander mode" that enables the discovery of the expander I/O module to which it is connected in the examples below. However, while a specific example has been provided, one of skill in the art in possession of the present disclosure will recognize that switching I/O modules may couple to expander I/O modules in a variety of manners that will fall within the scope of the present disclosure as well.

The primary system chassis 302 may also house a plurality of server devices 306a, 306b, and up to 306c, each of which is coupled to the switching I/O module 304 via, for example, a respective server port on the switching I/O module 304. In an embodiment, any or all of the server devices 306a-c may be provided by the IHS 100 discussed above with reference to FIG. 1 and/or may include some or all of the components of the IHS 100, and in specific examples may include blade servers and/or other computing devices known in the art. The chassis 302 may also house a management module 308 that is coupled to each of the server devices 306a-c, as well as to the switching I/O module 304. In an embodiment, the management module 308 may be provided by any of a variety of subsystems that are configured to perform management operations for the components in the primary system 300. While a specific primary system 300 has been illustrated, one of skill in the art in possession of the present disclosure will recognize that primary systems (or other devices operating according to the teachings of the present disclosure in a manner similar to that described below for the primary system 300) may include a variety of components and/or component configurations for providing conventional primary system functionality, as well as the functionality discussed below, while remaining within the scope of the present disclosure as well.

Figure 4:
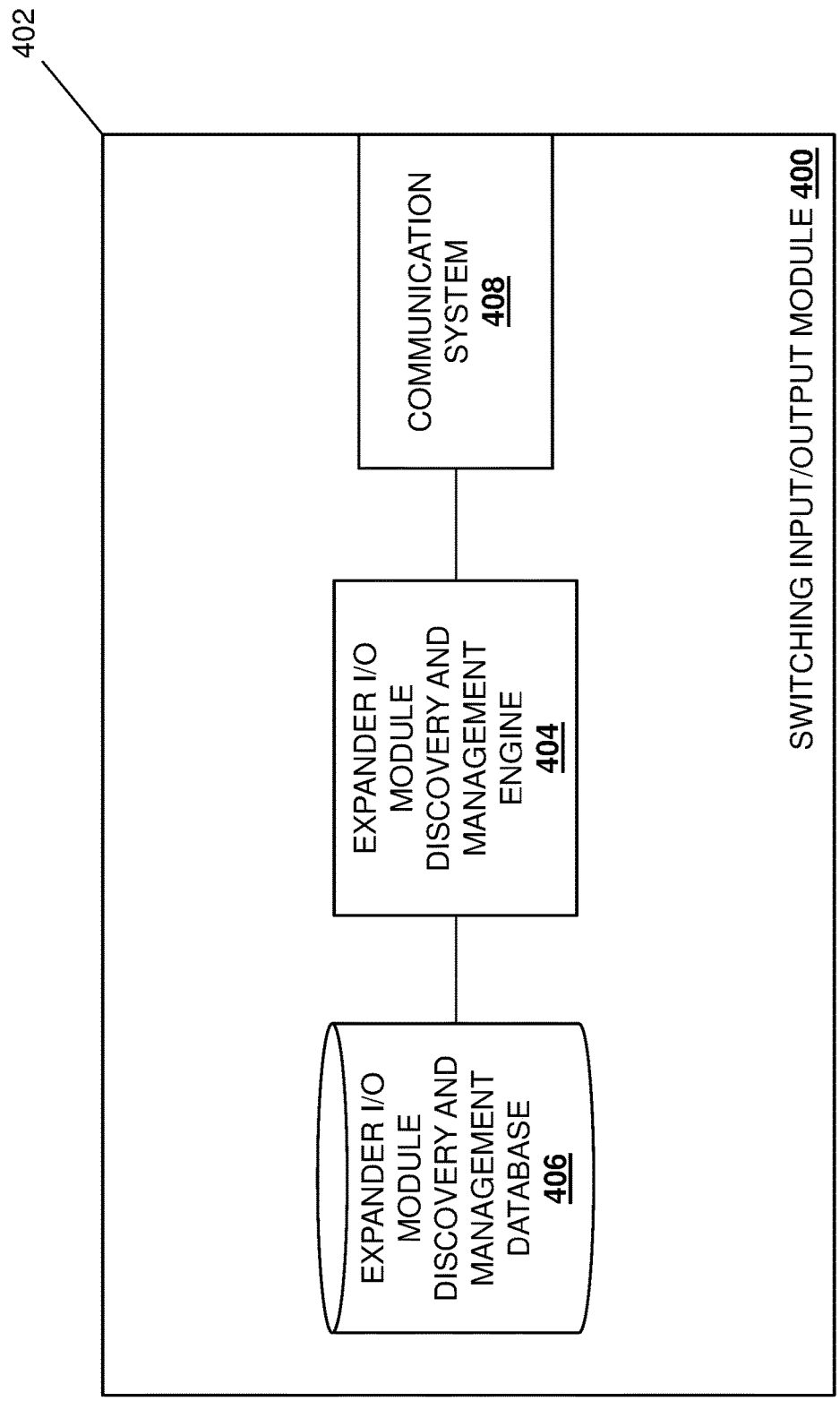
FIG. 4 is a schematic view illustrating an embodiment of a switching Input/Output (I/O) module that may be provided in the primary system of FIG. 3.

Referring now to FIG. 4, an embodiment of a switching I/O module 400 is illustrated that may provide the switching I/O module 304 discussed above with reference to FIG. 3. As such, the switching I/O module 400 may be provided by the IHS 100 discussed above with reference to FIG. 1 and/or may include some or all of the components of the IHS 100, and in specific examples may be the PowerEdge MX5108n Ethernet Switch I/O Module switch device or a PowerEdge MX9116n switch device, available from DELL® Inc. of Round Rock, Tex., United States. Furthermore, while illustrated and discussed as a switching I/O module 400, one of skill in the art in possession of the present disclosure will recognize that the functionality of the switching I/O module 400 discussed below may be provided by other devices that are configured to operate similarly as the switching I/O module 400 discussed below. In the illustrated embodiment, the switching I/O module 400 includes a chassis 402 that houses the components of the switching I/O module 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an expander I/O module discovery and management engine 404 that is configured to perform the functionality of the expander I/O module discovery and management engines and/or switching I/O modules discussed below.

The chassis 402 may also house a storage system (not illustrated, but which may include the storage 108 discussed above with reference to FIG. 1) that is coupled to the expander I/O module discovery and management engine 404 (e.g., via a coupling between the storage system and the processing system) and that includes an expander I/O module discovery and management database 406 that is configured to store any of the information utilized by the expander I/O module discovery and management engine 404 discussed below. The chassis 402 may also house a communication system 408 that is coupled to the expander I/O module discovery and management engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In a specific example, the communication system 408 may include any of the ports on the switching I/O module 400 discussed herein as providing connectivity between the switching I/O module 400 and any other components in the multi-chassis system 200. While a specific switching I/O module 400 has been illustrated, one of skill in the art in possession of the present disclosure will recognize that switching I/O modules (or other devices operating according to the teachings of the present disclosure in a manner similar to that described below for the switching I/O module 400) may include a variety of components and/or component configurations for providing conventional switching I/O module functionality, as well as the functionality discussed below, while remaining within the scope of the present disclosure as well.

Figure 5:
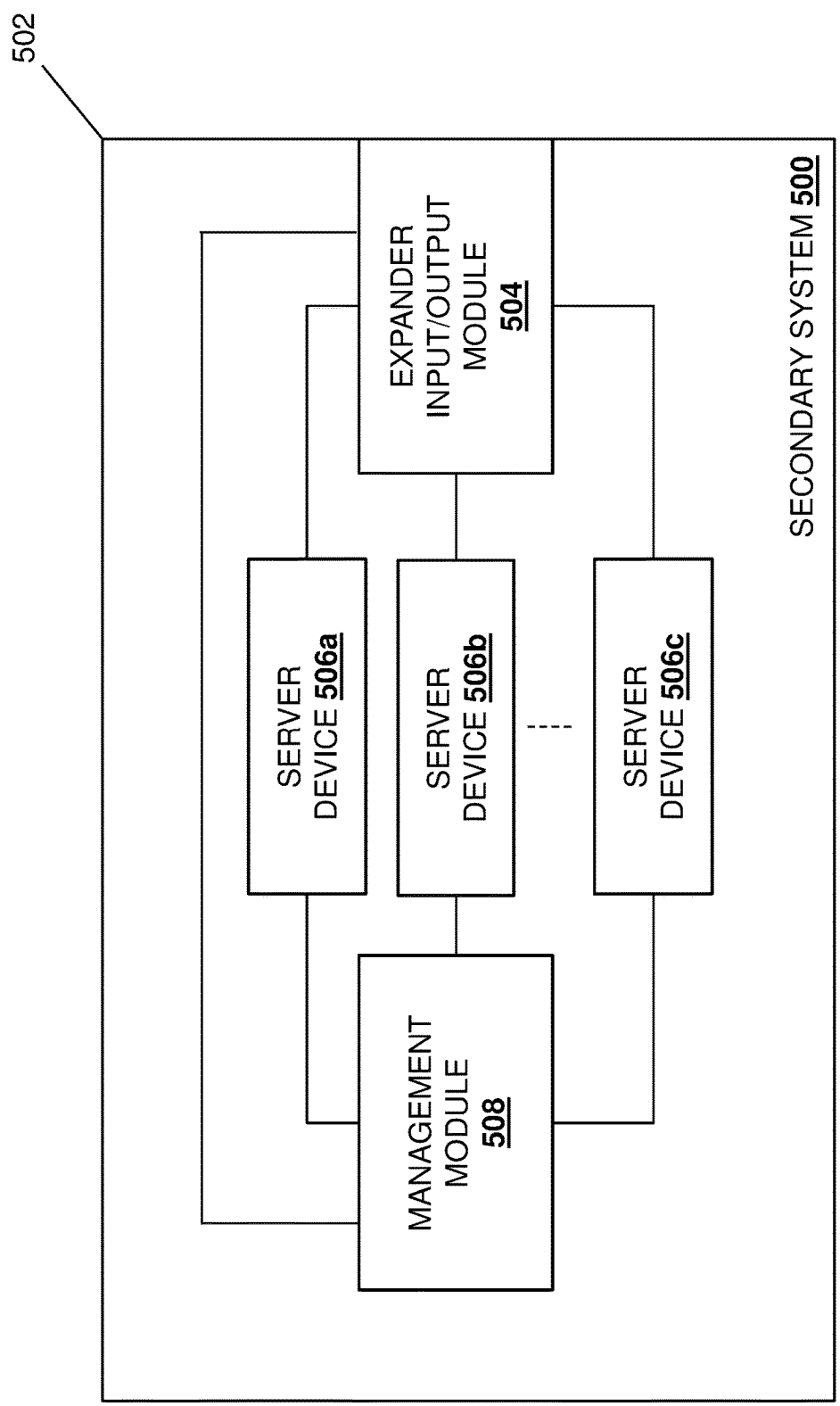
FIG. 5 is a schematic view illustrating an embodiment of a secondary system that may be provided in the multi-chassis system of FIG. 2.

Referring now to FIG. 5, an embodiment of a secondary system 500 is illustrated that may provide any or all of the secondary systems 206a-c discussed above with reference to FIG. 2. As such, the secondary system 500 may be provided by the IHS 100 discussed above with reference to FIG. 1 and/or may include some or all of the components of the IHS 100, and in specific examples may include the PowerEdge MX7000 Modular Chassis available from DELL® Inc. of Round Rock, Tex., United States. Furthermore, while illustrated and discussed as a secondary system with an expander I/O module, one of skill in the art in possession of the present disclosure will recognize that the secondary system 500 may include any devices that may be configured to operate similarly as the secondary system 500 discussed below by, for example, relying on a primary system to perform a variety of other operations. In the illustrated embodiment, the secondary system 500 includes a secondary system chassis 502 that houses the components of the secondary system 500, only some of which are illustrated below.

For example, the secondary system chassis 502 may house an expander I/O module 504 that, as discussed above, may be provided by the PowerEdge MX7116n Fabric Expander I/O Module expander device, available from DELL® Inc. of Round Rock, Tex., United States, that is configured as passive pass-through device that connects components in its secondary system to the switching I/O module in the primary system 202 in order to allow the switching I/O module in the primary system 202 to perform any needed switching operations in order to, for example, transmit its communications via the network 204. While only a single expander I/O module 504 is illustrated, one of skill in the art in possession of the present disclosure will recognize that the secondary system 206a-c/500 will typically include multiple expander I/O modules (e.g., for redundancy), and such configurations are envisioned as falling within the scope of the present disclosure as well. While not illustrated, one of skill in the art in possession of the present disclosure will recognize that the expander I/O module 504 may include "backplane" ports that couple to respective server devices in the secondary system 500 as discussed below, as well as "uplink" ports that couple to the switching I/O module 404 in the primary system 202/400.

As discussed above, the switching I/O module 304/400 may include one or more fabric expander ports that couple to the expander I/O module 504 in the secondary system 500. The specific example above describes the switching I/O module 304/400 providing a port group to connect to the expander I/O module 504 in the secondary system 500, with that port group providing a 200G "front panel port" made up of eight 25G ports, and thus the expander I/O module 504 may include eight 25G uplink ports that couple to the port group provided by the switching I/O module 304/500 (e.g., providing a respective 25G connection to each of eight server devices coupled to the expander I/O module 504.) As will be appreciated by one of skill in the art in possession of the present disclosure, the port group discussed above that is provided by the switching I/O module 304/400 to the expander I/O module 504 may be a first port group provided for eight server devices coupled to the expander I/O module 504, and a substantially similar second port group may be provided to that expander I/O module 504 by the switching I/O module in order to provide similar connectivity to eight additional server devices in the secondary system 500. However, while a specific example has been provided, one of skill in the art in possession of the present disclosure will recognize that expander I/O modules may couple to switching I/O modules in a variety of manners that will fall within the scope of the present disclosure as well. For example, in other embodiments, the uplink ports on the expander I/O module discussed above may couple to a TOR switch device that is configured in a Packet Transfer Mode (PTM).

The secondary system chassis 502 may also house a plurality of server devices 506a, 506b, and up to 506c, each of which is coupled to the expander I/O module 504 via, for example, a respective backplane port on the expander I/O module 504. In an embodiment, any or all of the server devices 506a-c may be provided by the IHS 100 discussed above with reference to FIG. 1 and/or may include some or all of the components of the IHS 100, and in specific examples may include blade servers. The chassis 502 may also house a management module 508 that is coupled to each of the server devices 506a-c, as well as to the expander I/O module 504. In an embodiment, the management module 508 may be provided by any of a variety of subsystems that are configured to perform management operations for the components in the secondary system 500. While a specific secondary system 500 has been illustrated, one of skill in the art in possession of the present disclosure will recognize that secondary systems (or other devices operating according to the teachings of the present disclosure in a manner similar to that described below for the secondary system 500) may include a variety of components and/or component configurations for providing conventional secondary system functionality, as well as the functionality discussed below, while remaining within the scope of the present disclosure as well.

Figure 6:
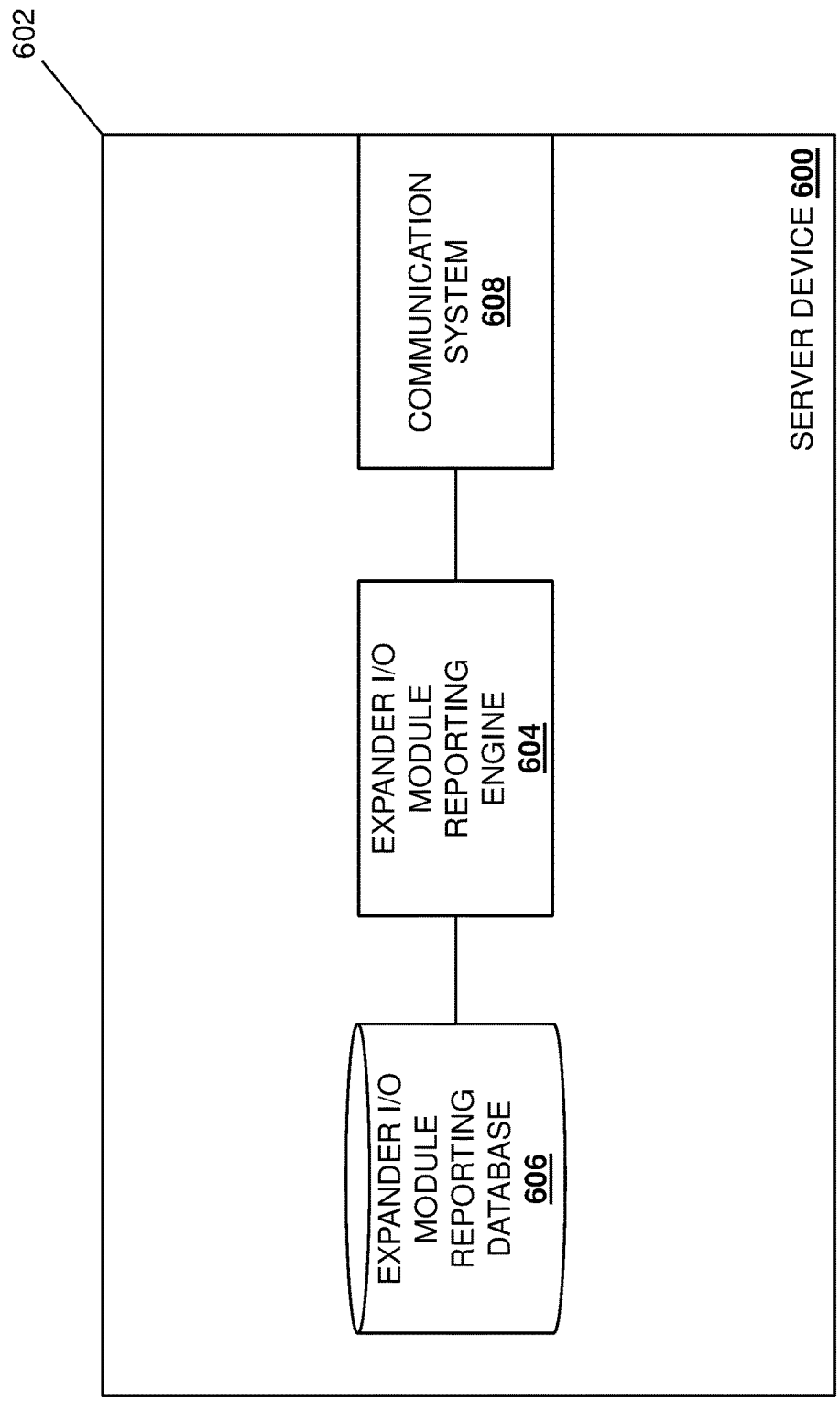
FIG. 6 is a schematic view illustrating an embodiment of a server device that may be provided in the secondary system of FIG. 5.

Referring now to FIG. 6, an embodiment of a server device 600 is illustrated that may provide any or all of the server devices 506a-506c discussed above with reference to FIG. 5. As such, the server device 600 may be provided by the IHS 100 discussed above with reference to FIG. 1 and/or may include some or all of the components of the IHS 100, and in specific examples may be provided by a blade server Furthermore, while illustrated and discussed as a server device 600, one of skill in the art in possession of the present disclosure will recognize that the functionality of the server device 600 discussed below may be provided by other devices that are configured to operate similarly as the server device 600 discussed below. In the illustrated embodiment, the server device 600 includes a chassis 602 that houses the components of the server device 600, only some of which are illustrated below. For example, the chassis 602 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an expander I/O module reporting engine 404 that is configured to perform the functionality of the expander I/O module reporting engines and/or server devices discussed below.

In a specific example, the expander I/O module reporting engine may be provided by a Baseboard Management Controller (BMC) in the server device 600 that may be provided by, for example, an integrated DELL® Remote Access Controller (IDRAC) available from DELL® Inc. of Round Rock, Tex., United States that one of skill in the art in possession of the present disclosure will recognize provides a out-of-band management platform for the server device 600 utilizing (mostly) separate resources from the server device resources (e.g., a separate processing system, memory system, network connection, system bus access, etc.) and via a browser-based or Command Line Interface (CLI) user interface that allows for monitoring and management of the server device 600 including power management, virtual media access, remote console capabilities, and/or other server device functionality in a manner similar to if the user were at a local console. However, one of skill in the art in possession of the present disclosure will recognize that the expander I/O module reporting functionality described herein may be performed by a variety of server device subsystems while remaining within the scope of the present disclosure as well.

The chassis 602 may also house a storage system (not illustrated, but which may include the storage 108 discussed above with reference to FIG. 1) that is coupled to the expander I/O module reporting engine 604 (e.g., via a coupling between the storage system and the processing system) and that includes an expander I/O module reporting database 606 that is configured to store any of the information utilized by the expander I/O module reporting engine 604 discussed below. The chassis 602 may also house a communication system 608 that is coupled to the expander I/O module reporting engine 604 (e.g., via a coupling between the communication system 608 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In a specific example, the communication system 608 may include any of the ports on the server devices discussed herein as providing connectivity to the expander I/O module 600 and any other components in the multi-chassis system 200. While a specific server device 600 has been illustrated, one of skill in the art in possession of the present disclosure will recognize that server devices (or other devices operating according to the teachings of the present disclosure in a manner similar to that described below for the server device 600) may include a variety of components and/or component configurations for providing conventional server functionality (e.g., a Central Processing Unit (CPU) and/or other components that are separate from the BMC components discussed above and utilized to provide server device functionality), as well as the functionality discussed below, while remaining within the scope of the present disclosure as well.

Figure 7:
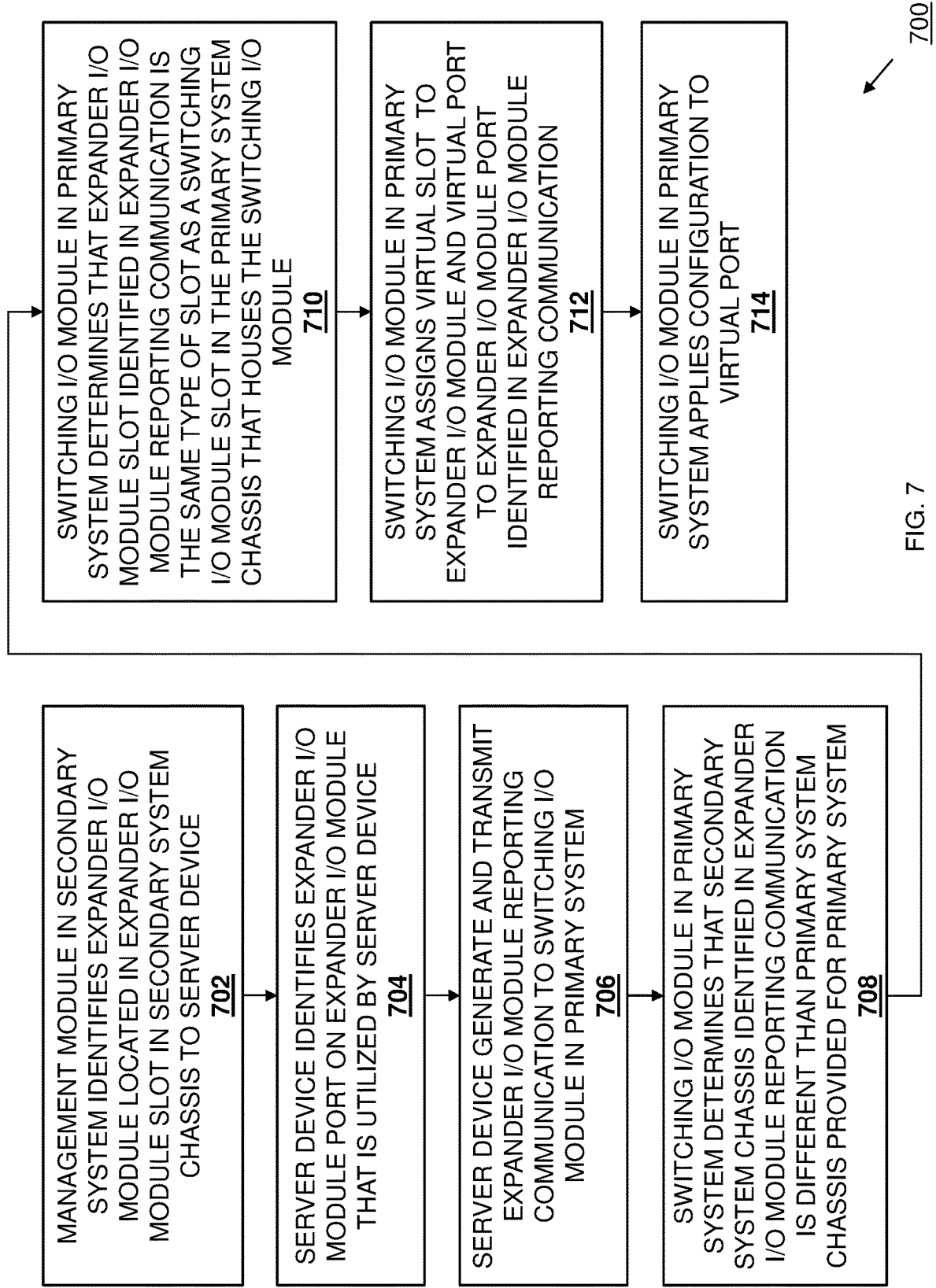
FIG. 7 is a flow chart illustrating an embodiment of a method for discovering and managing expander I/O modules.

Referring now to FIG. 7, an embodiment of a method 700 for discovering and managing expander I/O modules is illustrated. As discussed below, the systems and methods of the present disclosure provide a switching I/O module that performs automatic discovery and management of connected expander I/O modules in a multi-chassis system in order to dynamically discovery and manage ports on the expander I/O modules that are utilized by server devices. This is enabled, as least in part, by communications between the server devices and the switching I/O module via the expander I/O module(s) that allow the switching I/O module to virtualize the expander I/O modules by, for example, assigning a virtual slot to discovered I/O modules, and assigning respective virtual ports to the expander I/O module ports on the expander I/O module that are utilized by the server devices. For example, in a multi-chassis system with a primary system having a primary system chassis housing a switching I/O module, and secondary system(s) having respective secondary chassis housing respective expander Input/Output (I/O) modules, any server device coupled to an expander I/O module in a secondary system may identify the secondary system chassis that houses their expander I/O module, and an expander I/O module port on their expander I/O module that is utilized by that server device. Those server device(s) may then generate and transmit an expander I/O module reporting communication to the switching I/O module that identifies the secondary system chassis and the expander I/O module port. The switching I/O module receives the expander I/O module reporting communication via the expander I/O module and determines that the secondary system chassis identified in the expander I/O module reporting communication is different than the primary system chassis. In response, the switching I/O module assigns a virtual slot to the expander I/O module, and assigns a virtual port that is associated with the virtual slot to the expander I/O module port identified in the expander I/O module reporting communication.

Figure 8:
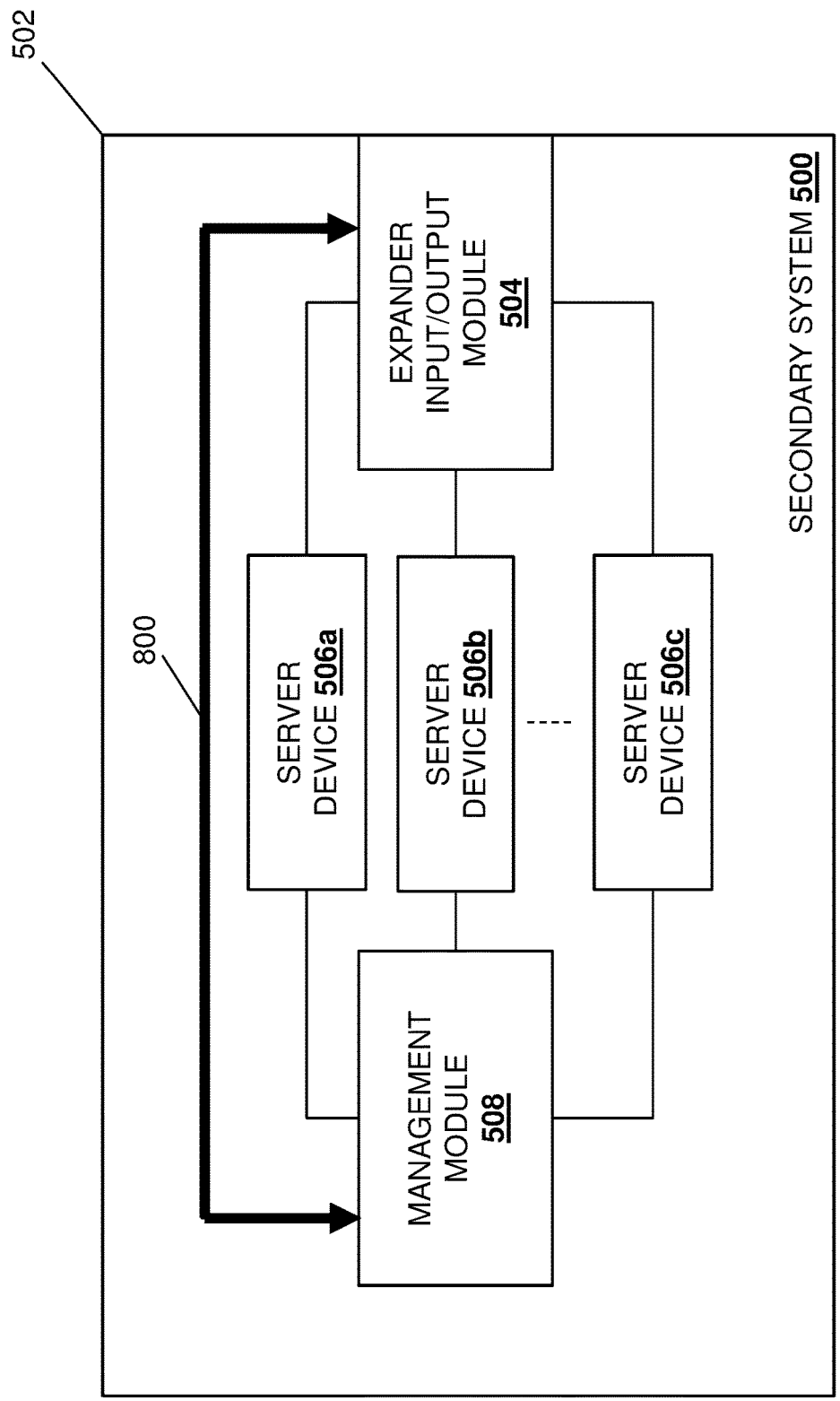
FIG. 8 is a schematic view illustrating an embodiment of the secondary system of FIG. 5 operating during the method of FIG. 7.

The method 700 begins at block 702 where a management module in a secondary system identifies an expander I/O module located in an expander I/O module slot in a secondary system chassis to a server device. With reference to FIG. 8, in an embodiment of block 702, the management module 508 in the secondary system 500 may perform expander I/O module access operations 800 in order to access the expander I/O module 504 in order to identify the expander I/O module 504 and an expander I/O module slot that is defined by the secondary system chassis 502 and that houses the expander I/O module 504. While block 702 is described for a single secondary system 500 below, one of skill in the art in possession of the present disclosure will recognize that the operations of the secondary system 500 may be performed by any of the secondary systems 206a-c discussed above with reference to FIG. 2 while remaining within the scope of the present disclosure.

For example, at block 702, the expander I/O module 504 may be connected to the secondary system 500 (e.g., inserted into the expander I/O module slot defined by the secondary system chassis 502, and connected (e.g., "plugged in") to a backplane in the secondary system chassis 502 such that the expander I/O module is coupled to the management module 508 (and the server devices 506a-506c)), and powered on, reset, and/or otherwise initialized. In response, the management module 508 may detect the presence of the expander I/O module 504 and, in response, may retrieve an expander I/O module service tag and/or other expander I/O module identifier from the expander I/O module 504 (e.g., located on an Electrically Erasable Programmable Read-Only Memory (EEPROM) or other storage subsystem in the expander I/O module 504), may identify the expander I/O slot in the secondary system chassis 502 in which the expander I/O module 504 is housed (e.g., via an expander I/O slot identifier that is assigned based on the location of the physical connection of the 200G port to the secondary system 500, interactions between the expander module and the management module at a hardware layer in order to identify the slot in which the expander module is located, and/or in a variety of other manners known in the art), and/or identify or retrieve any of a variety of other information utilized as discussed below and/or that would be apparent to one of skill in the art in possession of the present disclosure. However, while a few specific examples have been provided, one of skill in the art in possession of the present disclosure will recognize that information about the expander I/O module 502 (e.g., the identifications of the expander I/O module, the expander I/O module slot, etc.) may be retrieved/identified using a variety of techniques known in the art.

Figure 9:
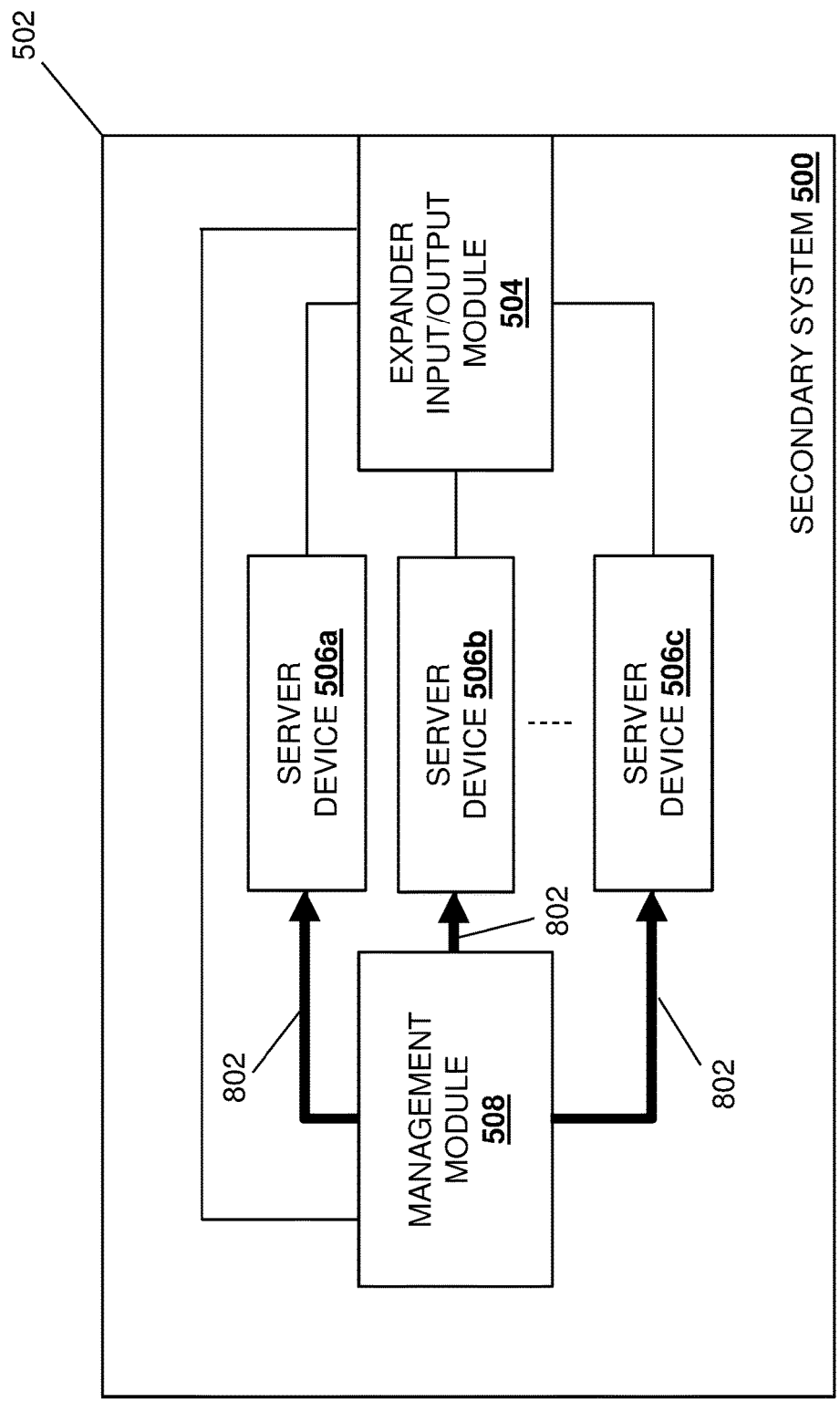
FIG. 9 is a schematic view illustrating an embodiment of the secondary system of FIG. 5 operating during the method of FIG. 7.

With reference to FIG. 9, in an embodiment of block 702 and in response to identifying the expander I/O module 504 and the expander I/O module slot, the management module 508 may generate and transmit expander I/O module information messages 802 that include identifications of the expander I/O module 504 and the expander I/O module slot (as well as any other information about the expander I/O module 504 retrieved/identified at block 702) to any or all of the server devices 506a-506c in the secondary system chassis 502. For example, as discussed above, each of the server devices 506a-506c may include a BMC (e.g., the iDRAC discussed above) that provides the expander I/O module reporting engine 604 in that server device 506a-c/600, and at block 704 the expander I/O module information messages 802 may be transmitted by the management module 508 to the BMC in each server device 506a-c. As such, at block 704, the expander I/O module reporting engine 604 in each server device 506a-c/600 may receive an expander I/O module information messages 802 via its communication system 608 and, in response, may identify the expander I/O module 504 to which it is connected in its secondary system chassis 502, as well as the expander I/O module slot that is defined by that secondary system chassis 502 and that houses that expander I/O module 504.

The method 700 then proceeds to block 704 where the server device identifies an expander I/O module port on the expander I/O module that is utilized by that server device. In an embodiment of block 704, the expander I/O module reporting engine 604 in each server device 506a-c/600 may operate to identify the expander I/O module port that it utilizes on the expander I/O module 504, as well as a variety of other component and/or configuration information about the secondary system 500. With reference to the specific example provided below, at block 704, the BMC (e.g., the iDRAC discussed above) in the server device 600 that provides the expander I/O module reporting engine 604 may access secondary system component and/or configuration information (e.g., in a storage and/or memory system in the BMC (e.g., the expander I/O module reporting database 606), available via communications by the BMC with components in the secondary system 500, etc.) in order to retrieve and/or identify a port type of the expander I/O module port on the expander I/O module 504 that is utilized by that server device 600, a port Fully Qualified Device Descriptor (FQDD) for the expander I/O module port on the expander I/O module 504 that is utilized by that server device 600, a server device service tag or other server device identifier for that server device 600, a server device model name for that server device 600, a server device slot number for the server device slot that is defined by the secondary system chassis 502 and that houses that server device 600, a chassis server tag or other chassis identifier for the secondary system chassis 502, a chassis model name for the secondary system chassis 502, an expander I/O module model name for the expander I/O module 504, an expander I/O module port number that identifies the expander I/O module port on the expander I/O module 504 that is utilized by that server device 600, and/or any other information that would be apparent to one of skill in the art in possession of the present disclosure. As will be appreciated by one of skill in the art in possession of the present disclosure, the BMC in a server device may be provided with and/or have access to any of a variety of secondary system details, and thus any of those details may be retrieved and/or identified at block 704.

The method 700 then proceeds to block 706 where the server device generates an expander I/O module reporting communication and transmits that expander I/O module reporting communication to a switching I/O module in a primary system. In an embodiment, at block 706, the expander I/O module reporting engine 604 in each server device 506a-c/600 may operate to utilize the identifications of the expander I/O module 504 and the expander I/O module slot (as well as any other information about the expander I/O module 504 retrieved/identified at block 702), the identification of the expander I/O module port on the expander I/O module that is utilized by that server device (as well as any other information accessed/retrieved at block 704), in order to generate an expander I/O module reporting communication. For example, at block 706, the BMC (e.g., the iDRAC discussed above) in the server device 600 that provides the expander I/O module reporting engine 604 may generate a Link Layer Discovery Protocol (LLDP) communication including customer Type-Length-Value (TLV) structures that store any of the information transmitted in the expander I/O reporting communication as discussed below, as well as any other information that would be apparent to one of skill in the art in possession of the present disclosure.

With reference to FIG. 10, a specific example of an expander I/O reporting communication 1000 that may be generated and transmitted by the server device 600 at block 706 is illustrated. In the illustrated embodiment, the expander I/O reporting communication 1000 includes a sub-type 1 associated with an originator property that, as illustrated in the comments associated with the sub-type 1, may provide a "BMC" string in order to allow the switching I/O module that receives the expander I/O reporting communication 1000 to identify the expander I/O reporting communication 1000 as a communication (e.g., an LLDP communication) originating from the BMC in the server device 600 (e.g., rather than as one of many LLDP communications that may originate from other components in the server device 600). The illustrated example of the expander I/O reporting communication 1000 also includes a sub-type 2 associated with a port type property that, as illustrated in the comments associated with the sub-type 2, may identify the port type of the expander I/O port on the expander I/O module that is utilized by the server device 600 as a BMC port (e.g., via a "1" designation), a NIC port (e.g., via a "2" designation), or a shared BMC/NIC port (e.g., via a "3" designation).

The illustrated example of the expander I/O reporting communication 1000 also includes a sub-type 3 associated with a port FQDD property that, as illustrated in the comments associated with the sub-type 3, may allow the switching I/O module that receives the expander I/O reporting communication 1000 to identify a NIC Port in the server device 600 that is coupled to the expander I/O module 504. The illustrated example of the expander I/O reporting communication 1000 also includes a sub-type 4 associated with a server service tag property that, as illustrated in the comments associated with the sub-type 4, may allow the switching I/O module that receives the expander I/O reporting communication 1000 to identify the server device 600. The illustrated example of the expander I/O reporting communication 1000 also includes a sub-type 5 associated with a server model name property that, as illustrated in the comments associated with the sub-type 5, may allow the switching I/O module that receives the expander I/O reporting communication 1000 to identify a model of the expander I/O device 600. The illustrated example of the expander I/O reporting communication 1000 also includes a sub-type 6 associated with a server slot number property that, as illustrated in the comments associated with the sub-type 6, may allow the switching I/O module that receives the expander I/O reporting communication 1000 to identify a server device slot that is defined by the secondary system chassis 504 and that houses the server device 600.

The illustrated example of the expander I/O reporting communication 1000 also includes a sub-type 7 that is associated with a chassis service tag property that, as illustrated in the comments associated with the sub-type 7, may allow the switching I/O module that receives the expander I/O reporting communication 1000 to identify the secondary system chassis 502. The illustrated example of the expander I/O reporting communication 1000 also includes a sub-type 8 that is associated with a chassis model name property that, as illustrated in the comments associated with the sub-type 8, may allow the switching I/O module that receives the expander I/O reporting communication 1000 to identify the model of the secondary system chassis 502. The illustrated example of the expander I/O reporting communication 1000 also includes a sub-type 9 that is associated with a expander I/O module service tag property that, as illustrated in the comments associated with the sub-type 9, may allow the switching I/O module that receives the expander I/O reporting communication 1000 to identify the expander I/O module 504. The illustrated example of the expander I/O reporting communication 1000 also includes a sub-type 10 that is associated with a expander I/O module model name property that, as illustrated in the comments associated with the sub-type 10, may allow the switching I/O module that receives the expander I/O reporting communication 1000 to identify the model of the expander I/O module 504.

The illustrated example of the expander I/O reporting communication 1000 also includes a sub-type 11 that is associated with a expander I/O module slot label property that, as illustrated in the comments associated with the sub-type 11, may allow the switching I/O module that receives the expander I/O reporting communication 1000 to identify the expander I/O module slot that is defined by the secondary system chassis 502 and that houses the expander I/O module 504. The illustrated example of the expander I/O reporting communication 1000 also includes a sub-type 12 that is associated with a expander I/O module port number property that, as illustrated in the comments associated with the sub-type 12, may allow the switching I/O module that receives the expander I/O reporting communication 1000 to identify the expander I/O module port on the expander I/O module 504 that is utilized by the server device 600. However, while a specific example of an expander I/O reporting communication 1000 has been illustrated and described, one of skill in the art in possession of the present disclosure will recognize that expander I/O reporting communications according to the teachings of the present disclosure may be provided using a variety of techniques and may include a variety of information while remaining within the scope of the present disclosure as well.

Figure 11:
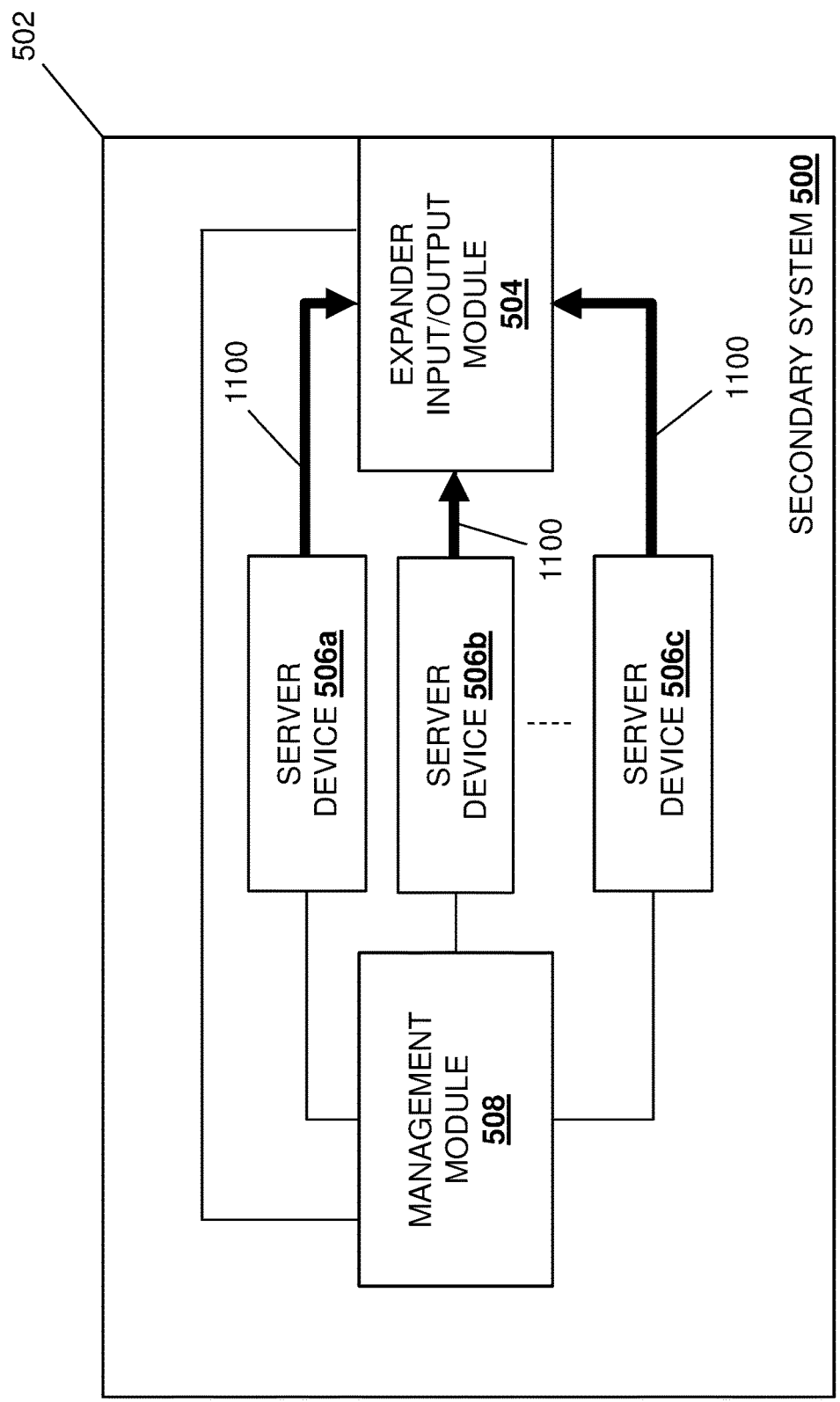
FIG. 11 is a schematic view illustrating an embodiment of the secondary system of FIG. 5 operating during the method of FIG. 7.
Figure 12:
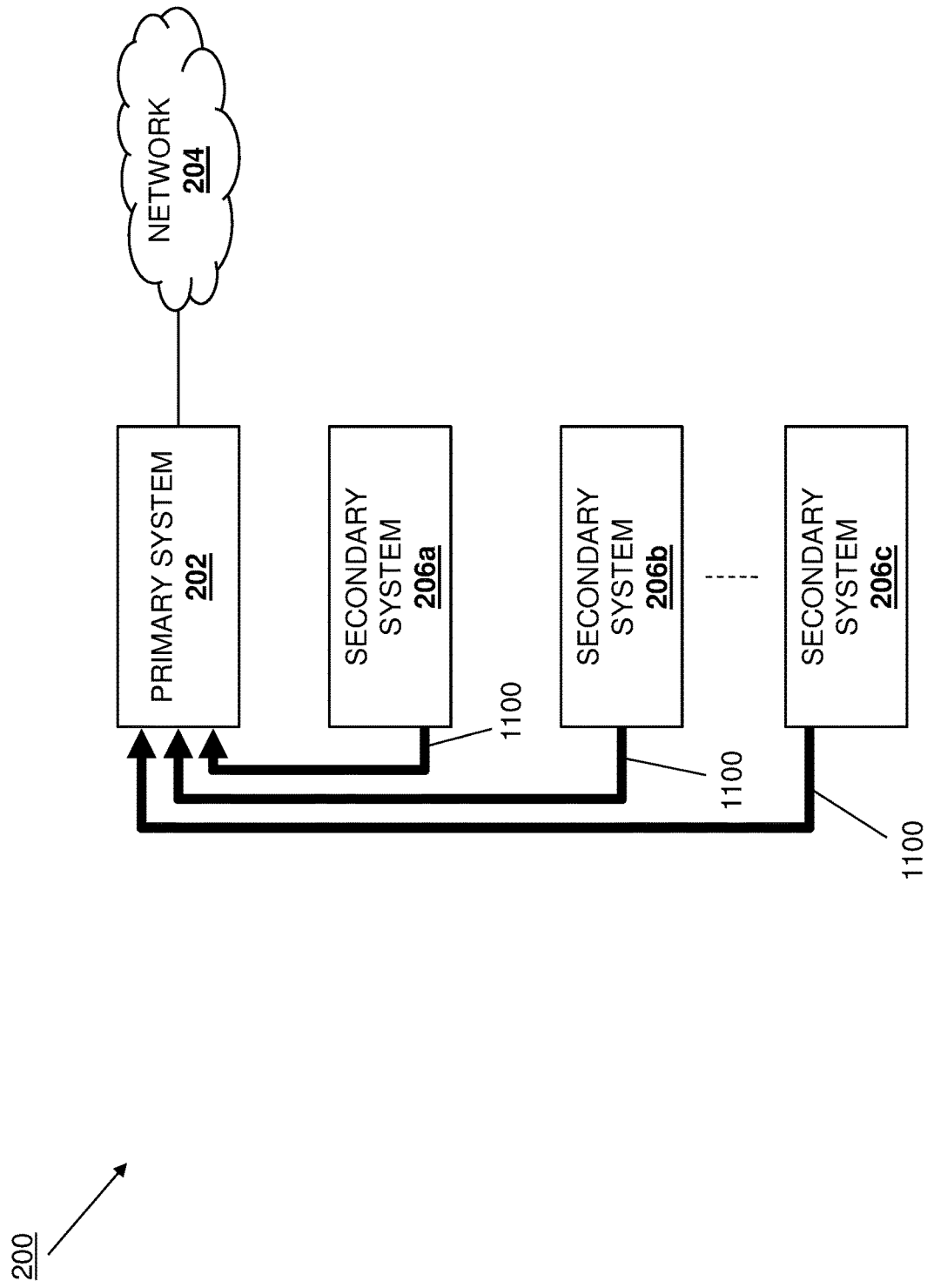
FIG. 12 is a schematic view illustrating an embodiment of the multi-chassis system of FIG. 2 operating during the method of FIG. 7.

As illustrated in FIGS. 11 and 12, at block 706, the expander I/O module reporting engine 604 (e.g., provided by a BMC) in each of the server devices 506a-c/600 may then operate to transmit expander I/O module reporting communications 1100 via its communication system 608 and through the expander I/O module (e.g., via the expander I/O module port utilized by each of those server devices 506a-c/600) to the primary system 202. FIG. 12 illustrates how each of the secondary systems 206a-c may transmit multiple expander I/O module reporting communications 1100 from its server devices to the primary system 202, which one of skill in the art in possession of the present disclosure will appreciate allows any server device included in any of the secondary systems 206a-c to report information about the expander I/O module in its secondary system to which it is connected, along with a variety of other information about that secondary system as well.

The method 700 then proceeds to block 708 where the switching I/O module in the primary system determines that the secondary system chassis identified in the expander I/O module reporting communication is different than a primary system chassis provided for the primary system. In an embodiment, at block 708, the switching I/O module 304 in the primary system 202/300 may receive any expander I/O module reporting communication 1000/1100 generated and transmitted by a secondary system 206a-c. As such, at block 708, the expander I/O module discovery and management engine 404 in the switching I/O module 304/400 may receive expander I/O module reporting communication(s) 1000/1100 via its communication system 408. As discussed above with reference to the example of the expander I/O module communication 1000 illustrated in FIG. 10, the expander I/O module reporting communication 1000/1100 may include a sub-type 1 associated with an originator property that may provide a "BMC" string, and at block 708, the expander I/O module discovery and management engine 404 in the switching I/O module 304/400 may read the "BMC" string in the originator property of sub-type 1 and identify the expander I/O reporting communication 1000/1100 as a communication (e.g., an LLDP communication) originating from the BMC in the server device 600 (e.g., rather than as one of many LLDP communications that may originate from other components in the server device 600). For example, the expander I/O module discovery and management engine 404 in the switching I/O module 304/400 may be configured to only perform the expander I/O discovery functionality discussed below in response to receiving LLDP communications from the BMC in the server device 600, and thus a determination at block 708 that an LLDP communication has been received from a component in the server device other than the BMC may be ignored by the expander I/O module discovery and management engine 404 in the switching I/O module 304/400.

As also discussed above with reference to the example of the expander I/O module communication 1000 illustrated in FIG. 10, the expander I/O reporting communication 1000/1100 also includes a sub-type 7 that is associated with a chassis service tag property, and at block 708, the expander I/O module discovery and management engine 404 in the switching I/O module 304/400 may read the chassis service tag in the chassis service tag property of sub-type 7 and identify the secondary system chassis 502 that houses the server device from which the expander I/O reporting communication 1000/1100 was received (and thus houses the expander I/O module 504 identified in that expander I/O reporting communication 1000/1100 as well.) In response to identifying the secondary system chassis 502 via that chassis service tag, the expander I/O module discovery and management engine 404 in the switching I/O module 304/400 may compare that chassis service tag to a chassis service tag that identifies the primary system chassis 302 in which the switching I/O module 304/400 is located, and determine that the chassis service tag for the secondary system chassis 502 that houses the expander I/O module 504 is different than the chassis service tag for the primary system chassis 302 that houses the switching I/O module 304.

As discussed above, in some embodiments, the determination by the switching expander I/O module discovery and management engine 404 in the switching I/O module 304/400 that the chassis service tag for the secondary system chassis 502 that houses the expander I/O module 504 is different than the chassis service tag for the primary system chassis 302 that houses the switching I/O module 304 may only be performed for LLDP communications received from the BMC in the server device. Furthermore, the expander I/O module discovery and management engine 404 in the switching I/O module 304/400 may be configured to only perform the expander I/O discovery functionality discussed below in response to LLDP communications that identity that a chassis service tag for a secondary system chassis that houses an expander I/O module is different than the chassis service tag for the primary system chassis 302 that houses the switching I/O module 304, and thus a determination that an LLDP communication identifies the primary system chassis 302 may result in the method 700 ending.

The method 700 then proceeds to block 710 where the switching I/O module in the primary system determines that the expander I/O module slot identified in the expander I/O module reporting communication is the same type of slot as a switching I/O module slot in the primary system chassis that houses the switching I/O module. As discussed above with reference to the example of the expander I/O module communication 1000 illustrated in FIG. 10, the expander I/O module reporting communication 1000/1100 may include a sub-type 11 associated with an expander I/O module slot label property, and at block 708, the expander I/O module discovery and management engine 404 in the switching I/O module 304/400 may read the expander I/O slot label in the expander I/O slot label property of sub-type 1 and identify the expander I/O module slot that is defined by the secondary system chassis 502 and that houses the expander I/O module 504.

In response to identifying the expander I/O module slot that is defined by the secondary system chassis 502 and that houses the expander I/O module 504, the expander I/O module discovery and management engine 404 in the switching I/O module 304/400 may identify an I/O module slot type of the expander I/O module slot to an I/O module slot type of the switching I/O module slot that is defined by the primary system chassis 302 and that houses the switching I/O module 304, and determine that the expander I/O module slot that houses the expander I/O module 504 is the same type of I/O module slot as the switching I/O module slot that houses the switching I/O module 304. For example, the expander I/O module slot defined by the secondary system chassis 502 may be considered the same type of I/O module slot as the switching I/O module slot defined by the primary system chassis 302 when both of the expander I/O module slot and the switching I/O module slot are defined in the same location in the secondary system chassis 502 and the primary system chassis 302, respectively (e.g., both are provided in the respective I/O module slot locations labeled as "A1 slots" in each of the secondary system chassis 502 and the primary system chassis 302).

As discussed above, in some embodiments, the determination by the switching expander I/O module discovery and management engine 404 in the switching I/O module 304/400 that the expander I/O module slot that houses the expander I/O module 504 is the same type of I/O module slot as the switching I/O module slot that houses the switching I/O module 304 may only be performed for LLDP communications received from the BMC in a server device that is not included in the primary system chassis 302. Furthermore, the expander I/O module discovery and management engine 404 in the switching I/O module 304/400 may only be configured to perform the expander I/O discovery functionality discussed below in response to LLDP communications that identity that an expander I/O module slot that houses an expander I/O module is the same type of I/O module slot as the switching I/O module slot that houses the switching I/O module 304, and thus a determination that an LLDP communication identifies that an expander I/O module slot that houses an expander I/O module is a different type of I/O module slot as the switching I/O module slot that houses the switching I/O module 304 may result in the method 700 ending.

While a few specific examples have been provided that describes the switching I/O module 304 determining whether an expander I/O module reporting communication has been received from a server device that is located "behind" an expander I/O module (i.e., that server device is coupled to the switching I/O module in the primary system chassis via an expander I/O module in a different secondary system chassis) at block 710, one of skill in the art in possession of the present disclosure will recognize that a variety of operations and/or determinations may be performed by the switching I/O module in order to determine whether the expander I/O module identified in the expander I/O module reporting communication received at block 710 is an expander I/O module that is located in the same type of I/O module slot as the switching I/O module (i.e., indicating that it is being utilized by the server device to access the switching I/O module in order to communicate via the network) and in a different chassis than that switching I/O module. For example, any of the information included in the expander I/O module reporting communication 1000 discussed above with reference to FIG. 10 may be utilized by block 710 while remaining within the scope of the present disclosure as well.

The method 700 then proceeds to block 712 where the switching I/O module in the primary system assigns a virtual slot to the expander I/O module discovered via the expander I/O module reporting communication, and a virtual port to the expander I/O module port identified in the expander I/O module reporting communication. In an embodiment, at block 712 and in response to discovering an expander I/O module (e.g., that is in a different chassis than the switching I/O device and in the same type of I/O module slot as the switching I/O device in at least some of the examples provided above), the expander I/O module discovery and management engine 404 in the switching I/O module 304/400 may operate to assign a virtual slot to that expander I/O module, and assign a virtual port associated with that virtual slot to the expander I/O module port that is utilized by the server device that provided the expander I/O module reporting communication (which identifies that expander I/O module port).

In some examples, the expander I/O module discovery and management engine 404 in the switching I/O module 304/400 may automatically assign the virtual slot to the expander I/O module based on, for example, a port group on the switching I/O module 304 that is coupled to the expander I/O module 504. For example, the primary system 202/300 may be provided with a "Smart Fabric Mode" in which the expander I/O module discovery and management engine 404 in the switching I/O module 304/400 may identify the expander I/O module 504 and, in response, automatically identify its port group (e.g., a first port group) that is coupled to that expander I/O module 504 (discussed above), and then assign a virtual slot number to the expander I/O module 504 based on that port group. In other examples, the expander I/O module discovery and management engine 404 in the switching I/O module 304/400 may allow for the manual assignment of the virtual slot to the expander I/O module. For example, the primary system 202/300 may be provided with a "Full Switch Mode" in which the expander I/O module discovery and management engine 404 in the switching I/O module 304/400 may identify the expander I/O module 504 and, in response, inform a user (e.g., via a display device) that the expander I/O module 504 has been discovered. When the expander I/O module discovery and management engine 404 in the switching I/O module 304/400 receives a virtual slot identification from the user (e.g., via a Graphical User Interface (GUI) provided on the display device), it may assign a virtual slot number to the expander I/O module 504 based on the virtual slot identification provided by the user.

Following the assignment of the virtual slot to the expander I/O module 504 discovered via the method 700, the expander I/O module discovery and management engine 404 in the switching I/O module 304/400 may create a virtual port for the expander I/O module port (e.g., a backplane port) on the expander I/O module 504 that is coupled to the server device that provided the expander I/O module reporting communication (and which is identified in that expander I/O module reporting communication.) As discussed above, the switching I/O module 304 may provide a respective port group to connect to each expander I/O module in the secondary systems 206a-c, with each port group providing a 200G "front panel port" made up of eight 25G ports (called "physical breakout interfaces"), and the assignment of the virtual port to the expander I/O module port may include mapping a physical breakout interface (e.g., a 25G port in a port group in the example above) to that virtual port (e.g., each virtual port may be created and associated with a 25G physical breakout from the 200G front panel port).

With reference to FIG. 13, an embodiment of a CLI show command result 1300 for a CLI "show" command provided to the switching I/O module 302 in order list expander I/O modules discovered according to the method 700 is illustrated. As can be seen, the CLI show command result 1300 includes a row for each discovered expander I/O module, with each row including an identification of a service tag for that expander I/O module, a model of that expander I/O module, a type of that expander I/O module, a secondary system chassis service tag for the chassis that houses that expander I/O module, a system chassis expander I/O module slot in the secondary system chassis that houses that expander I/O module, a port group provided for that expander I/O module, and a virtual slot identifier for that expander I/O module.

As will be appreciated by one of skill in the art in possession of the present disclosure, the first expander I/O module that was discovered as indicated in the CLI show command result 1300 (e.g., the last expander I/O module in the CLI show command result 1300 with service tag "2SHFXC2", model "MX7116n Expander Module", Type "1", in the secondary system chassis with service tag "20CCT02", in expander I/O module slot "A1" in that secondary system chassis) was assigned a virtual slot identifier of "71" and a virtual port group of "1/1/1", the second expander I/O module that was discovered as indicated in the CLI show command result 1300 (e.g., the third-to-last expander I/O module in the CLI show command result 1300 with service tag "3RHFXC2", model "MX7116n Expander Module", Type "1", in the secondary system chassis with service tag "20CCT03", in expander I/O module slot "A1" in that secondary system chassis) was assigned a virtual slot identifier of "72" and a virtual port group of "1/1/2", and so on. Furthermore, each virtual port group may be mapped to physical ports. In the specific examples provided below, the virtual port group 1/1/1 is mapped to physical ports 17 and 18 and operates to provide eight 25G channels. Similarly, the virtual port group 1/1/2 may be mapped to physical ports 19 and 20, and so on.

Further still, a user may provide CLI "show" commands to the switching I/O module 302 to identify the mappings of physical-to-virtual ports provided according to the method 700. For example, an examples of such a show command may look as follows:

20CCT02-A1-12SHFXC2# show interface ethernet 1/1/17:1

Where "20CCT02" identifies the service tag for the secondary system chassis that houses the expander I/O slot that includes the physical expander I/O module port, "A1" identifies the expander I/O module slot in that secondary system chassis that houses that expander I/O module, "1" identifies the type of the secondary system chassis, "2SHFXC2" identifies the service tag for that expander I/O module, and "1/1/17:1" identifies the first channel provided by the expander I/O module physical port of interest (e.g., physical port 17) in the virtual port group provided for that expander I/O module (e.g., virtual port group 1/1/1). The respond to such a CLI show command may include:
Ethernet 1/1/17:1 is up, line protocol is dormant
Interface is mapped to Ethernet 1/71/1

Similarly, another example of such a show command may look as follows:
20CCT02-A1-12SHFXC2# show interface ethernet 1/1/17:2
Where "20CCT02" identifies the service tag for the secondary system chassis that houses the expander I/O slot that includes the physical expander I/O module port, "A1" identifies the expander I/O module slot in that secondary system chassis that houses that expander I/O module, "1" identifies the type of the secondary system chassis, "2SHFXC2" identifies the service tag for that expander I/O module, and "1/1/17:2" identifies the second channel provided by the expander I/O module physical port of interest (e.g., physical port 17) in the virtual port group provided for that expander I/O module (e.g., virtual port group 1/1/1). The respond to such a CLI show command may include:
Ethernet 1/1/17:2 is up, line protocol is dormant
Interface is mapped to Ethernet 1/71/2

Similarly, another example of such a show command may look as follows:
20CCT02-A1-12SHFXC2# show interface ethernet 1/1/18:3
Where "20CCT02" identifies the service tag for the secondary system chassis that houses the expander I/O slot that includes the physical expander I/O module port, "A1" identifies the expander I/O module slot in that secondary system chassis that houses that expander I/O module, "1" identifies the type of the secondary system chassis, "2SHFXC2" identifies the service tag for that expander I/O module, and "1/1/18:3" identifies the third channel provided by the expander I/O module physical port of interest (e.g., physical port 18) in the virtual port group provided for that expander I/O module (e.g., virtual port group 1/1/1). The respond to such a CLI show command may include:
Ethernet 1/1/18:3 is up, line protocol is dormant
Interface is mapped to Ethernet 1/71/7

The method 700 then proceeds to block 714 where the switching I/O module in the primary system applies a configuration to the virtual port. In an embodiment, at block 714, the expander I/O module discovery and management engine 404 in the switching I/O module 304/400 may apply any configurations desired for a server device to the virtual port that is assigned to the expander I/O module port utilized by that server device, and that is associated with the virtual slot that was assigned to the expander I/O module that includes that virtual port. For example, the types and method of configuration for the virtual ports may be the same as is used for other ports and interface configurations for the system, with specific configurations derived based on server device profiles/policies, and applied to virtual ports on which the server devices are discovered. As such, one of skill in the art in possession of the present disclosure will recognize that any configuration that may be applied to a physical port in the system may applied to the virtual ports/virtual port groups as well.

Thus, systems and methods have been described that provide a switching I/O module that performs automatic discovery and management of connected expander I/O modules in a multi-chassis system in order to dynamically manage ports on the expander I/O modules that are utilized by server devices. This is enabled, as least in part, by communications between the server devices and the switching I/O module via the expander I/O module(s) that allow the switching I/O module to virtualize the expander I/O modules by, for example, assigning a virtual slot to discovered I/O modules, and assigning respective virtual ports to the expander I/O module ports on the expander I/O module that are utilized by the server devices. For example, in a multi-chassis system with a primary system having a primary system chassis housing a switching I/O module and secondary system(s) having respective secondary chassis housing respective expander Input/Output (I/O) modules, any server device coupled to an expander I/O module in a secondary system may identify the secondary system chassis that houses their expander I/O module and an expander I/O module port on their expander I/O module that is utilized by that server device, and may then generate and transmit an expander I/O module reporting communication that identifies the secondary system chassis and the expander I/O module port. The switching I/O module receives the expander I/O module reporting communication via the expander I/O module and determines that the secondary system chassis identified in the expander I/O module reporting communication is different than the primary system chassis. In response, the switching I/O module assigns a virtual slot to the expander I/O module, and assigns a virtual port that is associated with the virtual slot to the expander I/O module port identified in the expander I/O module reporting communication. Configurations to be provided for the server devices may then be applied to their assigned virtual port associated with the virtual slot assigned to their connected expander I/O module.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device discovery and management system, comprising:
 a secondary system that includes a secondary system chassis housing a first secondary device and a second secondary device that is coupled to the first secondary device, wherein the second secondary device is configured to:
  identify the secondary system chassis that houses the first secondary device;
  identify a first secondary device port on the first secondary device that is utilized by the second secondary device; and
  generate and transmit a first secondary device reporting communication that identifies the secondary system chassis and the first secondary device port; and
 a primary system that includes a primary system chassis housing a primary device that is coupled to the first secondary device in the secondary system, wherein the primary device is configured to:
  receive, via the first secondary device from the second secondary device included in the secondary system, the first secondary device reporting communication and, in response:
   determine that the secondary system chassis identified in the first secondary device reporting communication is different than the primary system chassis and, in response, assign a virtual slot to the first secondary device; and assign a virtual port that is associated with the virtual slot to the first secondary device port identified in the first secondary device reporting communication.

2. The system of claim 1, wherein the second secondary device is configured to:

identify a first secondary device slot in the secondary system chassis that houses the first secondary device;

generate and transmit the first secondary device reporting communication that identifies the first secondary device slot along with the secondary system chassis and the first secondary device port, and wherein the primary device is configured to:

determine that the first secondary device slot is the same type of slot as a primary device slot in the primary system chassis that houses the primary device; and assign, in response to determining that the first secondary device slot is the same type of slot as a primary device slot in the primary system chassis that houses the primary device along with the determining that the secondary system chassis identified in the first secondary device reporting communication is different than the primary system chassis, the virtual slot to the first secondary device and assign the virtual port that is associated with the virtual slot to the first secondary device port.

3. The system of claim 1, wherein the first secondary device reporting communication is a Link Layer Discovery Protocol (LLDP) communication that identifies the secondary system chassis and the first secondary device port.

4. The system of claim 1, wherein the first secondary device is configured to:

automatically assign the virtual slot to the first secondary device based on a port group on the primary device that is coupled to the first secondary device.

5. The system of claim 1, wherein the primary device is configured to:

identify, to a user in response to determining that the secondary system chassis identified in the first secondary device reporting communication is different than the primary system chassis, the first secondary device;

receive, from the user in response to identifying the first secondary device, a virtual slot identification; and assign, based on the virtual slot identification, the virtual slot to the first secondary device.

6. The system of claim 1, wherein the primary device is configured to:

apply a configuration to the virtual port.

7. The system of claim 1, wherein the assigning the virtual port that is associated with the virtual slot to the first secondary device port identified in the first secondary device reporting communication includes:

creating the virtual port; and mapping the first secondary device port to the virtual port.

8. An Information Handling System (IHS), comprising:

a processing system; and a memory system that is coupled to the processing system and that includes instructions that, when executed by the processing system, cause the processing system to provide a device discovery and management engine that is configured to:

receive, via a first secondary device that is housed in a secondary system chassis provided for a secondary system from a second secondary device that is housed in the secondary system chassis provided for the secondary system and coupled to the first secondary device, a first secondary device reporting communication that identifies:

the secondary system chassis; and a first secondary device port on the first secondary device that is utilized by the second secondary device;

determine, in response to receiving the first secondary device reporting communication, that the secondary system chassis identified in the first secondary device reporting communication is different than a primary system chassis that houses the processing system and, in response, assign a virtual slot to the first secondary device; and assign a virtual port that is associated with the virtual slot to the first secondary device port identified in the first secondary device reporting communication.

9. The IHS of claim 8, wherein the first secondary device reporting communication is a Link Layer Discovery Protocol (LLDP) communication that identifies the secondary system chassis and the first secondary device port.

10. The IHS of claim 8, wherein the first secondary device discovery and management engine is configured to:

automatically assign the virtual slot to the first secondary device based on a port group that is coupled to the first secondary device.

11. The IHS of claim 8, wherein the first secondary device discovery and management engine is configured to:

identify, to a user in response to determining that the secondary system chassis identified in the first secondary device reporting communication is different than the primary system chassis, the first secondary device;

receive, from the user in response to identifying the first secondary device, a virtual slot identification; and assign, based on the virtual slot identification, the virtual slot to the first secondary device.

12. The IHS of claim 8, wherein the first secondary device discovery and management engine is configured to:

apply a configuration to the virtual port.

13. The IHS of claim 8, wherein the assigning the virtual port that is associated with the virtual slot to the first secondary device port identified in the first secondary device reporting communication includes:

creating the virtual port; and mapping the first secondary device port to the virtual port.

14. A method for discovering and managing devices, comprising:

receiving, by a primary device that is housed in a primary system chassis provided for a primary system via a first secondary device that is housed in a secondary system chassis provided for a secondary system from a second secondary device that is housed in the secondary system chassis provided for the secondary system and coupled to the first secondary device, a first secondary device reporting communication that identifies:

the secondary system chassis; and a first secondary device port on the first secondary device that is utilized by the second secondary device;

determining, by the primary device in response to receiving the first secondary device reporting communication, that the secondary system chassis identified in the first secondary device reporting communication is different than the primary system chassis and, in response, assign a virtual slot to the first secondary device; and assigning, by the primary device, a virtual port that is associated with the virtual slot to the first secondary device port identified in the first secondary device reporting communication.

15. The method of claim 14, further comprising:
identifying, by the second secondary device, the secondary system chassis that houses the first secondary device;
identifying, by the second secondary device, the first secondary device port on the first secondary device that is utilized by the second secondary device; and
generating and transmitting, by the second secondary device, the first secondary device reporting communication that identifies the secondary system chassis and the first secondary device port.

16. The method of claim 14, wherein the first secondary device reporting communication is a Link Layer Discovery Protocol (LLDP) communication that identifies the secondary system chassis and the first secondary device port.

17. The method of claim 14, further comprising:
automatically assigning, by the primary device, the virtual slot to the first secondary device based on a port group on the primary device that is coupled to the first secondary device.

18. The method of claim 14, further comprising:
identifying, by the primary device to a user in response to determining that the secondary system chassis identified in the first secondary device reporting communication is different than the primary system chassis, the first secondary device;
receiving, by the primary device from the user in response to identifying the first secondary device, a virtual slot identification; and
assigning, by the primary device based on the virtual slot identification, the virtual slot to the first secondary device.

19. The method of claim 14, further comprising:
applying, by the primary device, a configuration to the virtual port.

20. The method of claim 14, wherein the assigning the virtual port that is associated with the virtual slot to the first secondary device port identified in the first secondary device reporting communication includes:
creating, by the primary device, the virtual port; and
mapping, by the primary device, the first secondary device port to the virtual port.

* * * * *